United States Patent [19]
Gilson

[11] 3,914,581
[45] Oct. 21, 1975

[54] PULSE DURATION PROCESS CONTROLLER

[75] Inventor: Anton Gilson, Greece, N.Y.

[73] Assignee: Sybron Corporation, Rochester, N.Y.

[22] Filed: Mar. 9, 1973

[21] Appl. No.: 339,542

[52] U.S. Cl. ......... 235/92 CT; 137/87; 235/92 MT; 235/92 CV; 235/92 R; 235/92 DM; 235/151.1; 235/92 CC
[51] Int. Cl.² ..................... G05D 23/00; G05D 7/00
[58] Field of Search ...... 235/92 EV, 92 CT, 92 MT, 235/92 DM, 92 CA, 92 CV, 92 CC, 151.1; 318/636, 672, 619; 137/87

[56] References Cited
UNITED STATES PATENTS

| | | |
|---|---|---|
| 3,500,386 | 3/1970 | Venning .......................... 235/92 CT |
| 3,517,168 | 6/1970 | Gates et al...................... 235/92 CT |
| 3,548,169 | 12/1970 | Togneri........................... 235/92 CV |
| 3,622,767 | 11/1971 | Koepcke............................. 318/636 |
| 3,681,581 | 8/1972 | Paine et al....................... 235/151.1 |

*Primary Examiner*—Joseph M. Thesz, Jr.
*Attorney, Agent, or Firm*—Theodore B. Roessel; Joseph C. MacKenzie

[57] ABSTRACT

A process controller having a pulse output the duration of which is proportional to the product of gain, sample time and process deviation. The controller uses pulse rate techniques to derive the product from inputs representing gain, sample time and process deviation.

5 Claims, 1 Drawing Figure

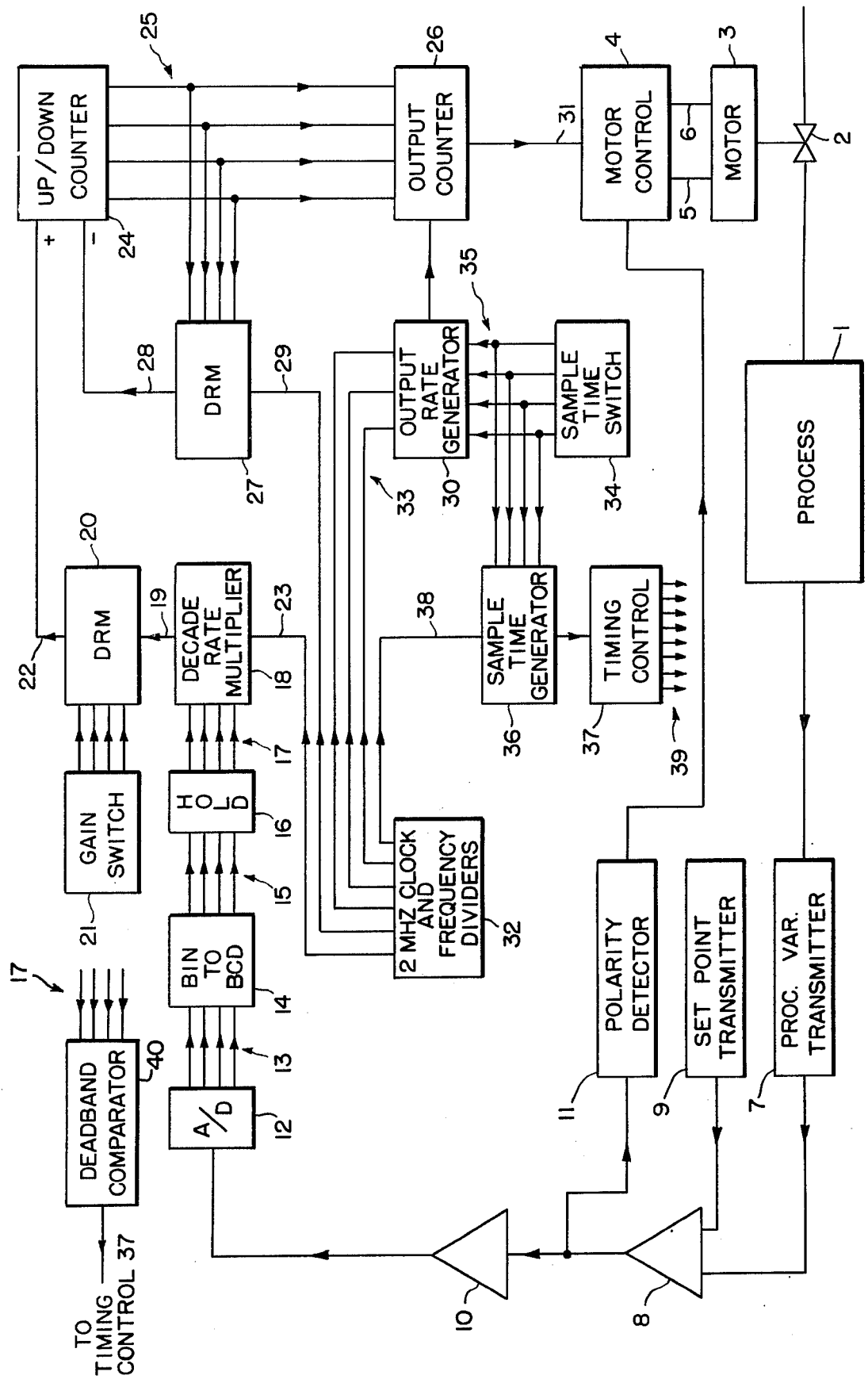

PULSE DURATION PROCESS CONTROLLER

BACKGROND OF THE INVENTION

The art field of the present invention is process control. In process control, a process controller in effect measures the state of a process, and, if the measured state deviates from the state desired, attempts to make the process assume the desired state. In a typical case, the controller acts on the process by means of a control valve through which fluid flows to (or from) the process. By causing the valve to vary the amount of such flow, the controller affects the process by translating information relating to the process into flow rate allowed by the valve.

In the prior art, it is known to translate process information into pulses the duration of which represent the control effect to be exercised on a process under control. The main object of the present invention is to provide an improved form of pulse duration process controller. Much more particularly, it is an object of the present invention to provide a process controller utilizing digital, analog, sampling and pulse rate techniques to produce an output pulse proportional to both process deviation and sampling time.

Another object of the invention is to provide a process controller utilizing pulse rate techniques for producing an output pulse as a function of process information.

SUMMARY

In the present invention, process information in analog and engineering form is converted to digital form and applied to a pulse rate multiplier. In response, the multiplier produces a digital output which is proportional to a process information, gain product. The digital output is counted down at a predetermined rate, whereby the time taken by counting down is proportional to the digital output. During this time the controller gates an operating signal to a process control valve, or equivalent process control element.

BRIEF DESCRIPTION OF THE DRAWING

The sole FIGURE is a schematic diagram of a process control system including the process controller according to the invention.

DESCRIPTION OF THE PREFERRED EMBODIMENT

In the drawing, fluid ingress (or egress) with respect to a process 1 is controlled by a valve 2. A motor 3 opens or closes the valve at a fixed rate depending on whether it is receiving a drive signal from a motor control 4 via a connection 5 or a connection 6. Control 4 will normally be conventional solid state circuitry for steering electrical power to appropriate terminals, as required by a controller such as the process controller according to the present invention.

As is customary, some process variable, such as temperature, is measured in order to provide an index of the state of the process, the measured value being transmitted by a process variable transmitter 7 to a summing amplifier 8. Amplifier 8, at the same time, is receiving another measured value from a set point transmitter 9. Transmitter 9 is essentially equivalent to transmitter 7 except that the measured value, i.e., the set point which the former transmits, is generally determined more or less independently of the measured value transmitted by the transmitter 7. In any event, it may supposed that when the two measured values have some predetermined relationship signifying that the state of the process is as desired, then the output signal of the amplifier also has a predetermined value, say zero. On the other hand, when the state of the process deviates from the desired state, then the output signal of amplifier 8 deviates from the predetermined value (or zero) and has a sense (or a sign) reflecting the sense of the deviation.

The output signal from amplifier 8 is a continuous measure of the deviation of the process at any instant, and continuously represents the sense of the deviation. An absolute value amplifier 10 receives the deviation signal from amplifier 8 and produces an output signal representing the absolute value of the deviation. Amplifier 10 is simply a device that produces an output signal proportional in magnitude to an input signal. A polarity detector 11 is also provided which detects, stores, and eventually passes on, the sense of the deviation to control 4 which in response enables output connection 5 or connection 6 depending on the sense of the output signal of amplifier 8.

The analog absolute value output signal of amplifier 10 is applied to converter 12 which converts the analog signal to a binary set of signals on output connections 13. The output connections 13 are connected to a converter 14 which converts the binary set to a binary coded decimal set of signals on its output connections 15. Connections 15 apply the decimal set to a register 16 which holds the signals for outputting them on connections 17 to a decade rate multiplier 18. Decade rate multiplier 18 is a device having a plurality of inputs to which is applied a binary coded decimal set of signals and in response produces a train of pulses having a frequency proportional to the number represented by the decimal set of signals. Output connection 19 of multiplier 18 connects the aforesaid pulse train to a second decade rate multiplier 20. Multiplier 20 receives a binary coded decimal set of signals set by a gain switch 21, and produces on its output connection 22 a pulse train having a frequency proportional to the frequency of the pulse train on connection 19, multiplied by the number represented by the decimal set of signals from switch 21. The output pulse train of each multiplier is derived from an input pulse train. In this case, as will later be seen, converter 18 has an external source of pulses at a fixed rate connected to it via a connection 23. The decimal set of signals applied to the multiplier controls which of these pulses appear at the output connection of the multiplier. The only difference between multipliers 18 and 20 is that the latter uses the output pulse train of the former as, in effect, an external pulse source. Consequently, the output pulse train on connection 22 has a frequency proportional to a number corresponding to the setting of gain switch 21.

Connection 22 applies the output pulses to the up-input of an up-down counter 24, which produces on its output connections 25, a binary coded decimal set of signals representing the net count of counter 24. The last set of signals is applied, via connections 25, to an output counter 26 and a third decimal rate multiplier 27. Multiplier 27, in turn, applies its output pulse train, via connection 28, to the down-input of up-down counter 24. This last pulse train derives from a external source of pulses on an input connection 29 as in the case of multiplier 18, except that two external sources are out of phase, but equal in frequency an order that the counter 24 not be presented with pulses on both its input simultaneously.

Counter 24 and multiplier 27 define a negative feedback system wherein the counter produces a set of signals on its output connections such as will make the output frequency of multiplier 27 equal to the output frequency of multiplier 20. The feedback system has an integrating property, and in response to a step change in output frequency of multiplier 20, exponentially seeks to bring the output frequency of multiplier 27 to equality with the new output frequency of multiplier 20. In servomechanism parlance, the feedback system has a first order lag.

Output counter 26, which also receives the set of signals on connections 25, has the function of counting down the number represented by the last said set of signals, under the control of an output rate generator 30. Output counter 26 is connected to motor control 4 via a connection 31 for the purpose, in effect, of commanding the control 4 to start the motor 3 (in whichever sense polarity detector 11 indicates) when the countdown of counter 26 starts, and to stop the motor when the countdown ends.

My controller, of course, operates on a sampled data basis, although the deviation signal is a continuous analog quantity. Hence, it is necessary to provide means for timing the operations described supra. The basic timing determinant is the sampling rate, meaning the frequency with which the deviation signal is acted upon by the digital section of the controller, or more precisely, the interval between consecutive samplings of the value of e, i.e. process deviation signal.

From the foregoing, it will be observed that various aspects of the controller's function need to be adjustable in order to accommodate the idiosyncracies of particular processes and control valves. The inherent nature of my controller is such that the largest number that can be presented to counter 26 is represented by the input pulse rate on connection 25. The maximum possible duration of output pulse will then be the aforesaid number divided by the lowest countdown rate of counter 26.

However, $e$, when not zero, can have a magnitude somewhat less than maximum, and at these times it will be seen that the member presented to counter 24 will be proportional to the product of the numbers held by registers 16 and 21. If the number on register 16 represents $e$, then the number in 21 ought to be a measure of how much the particular valve 2 should have its setting changes in order to nullify the deviation $e$ of the particular process under control. The number in 21 is therefore a gain or amplifying factor of the controller, and is normally set in manually, as by means of the gain switch 21 calibrated in decimal terms but producing a binary coded output applied to multiplier 20.

Also peculiar to the process is how long it can deviate before corrective action has to be applied, which is to say, what interval can be allowed between consecutive samplings of $e$, or consecutive corrective changes of valve setting? While it is possible that this interval may vary with time, for present purposes, this interval may on the whole be regarded as a fixed value determined mainly by the nature of the process. I introduce sampling interval into the controller's operation by way of output rate generator 30, by setting it to countdown the content of counter 26 at a rate proportional to sampling rate, more particularly, to the quotient of sampling interval divided into 100 times the maximum valve of $e$. This amounts to dividing the afore-described product of $e$ and gain by the said quotient.

It will be observed that the essence of my controller is the three multipliers, the two counters and the rate generator, so for a basically digital device it is extremely simple. Furthermore, use of the decade rate multipliers minimizes the amount of conversion necessary for accepting analog and engineering (i.e., decimal) inputs.

A pulse source 32, in the form of a 2 megaHertz clock with frequency dividers, provides for operation of the multipliers, rate generator and counters. Thus, it produces 1 mHz on each of connections 23 and 29 by what amounts in effect to gating pulses at a 2 mHz rate alternately to the connections, so that each thereof receives pulses at a 1 mHz rate, but out of phase.

In addition, further divisions of the basic 2 mHz clock rate provides for changing the effective range of the gain switch 21. Thus, the three connections 33 between source 32 and generator 30 provide for applying to the latter, pulses at the respective rates of $10^5$, $10^4$ and $10^3$ Hz, (generator 30, of course, being provided with selector means not shown for manually selecting one of the said rates). If the basic range of the gain switch 21 is zero to 99, changing the countdown rate of counter 26 can vary the gain nominally indicated by the switch setting. In the present case, when the generator 30 is operating on the $10^3$ Hz input, I consider the gain of the controller to be equal to the nominal setting of the switch 21. Accordingly, if the countdown rate be sped up by instead operating at the $10^4$ Hz, as the $10^5$ Hz rate, then the reading of the gain switch 21 has to be divided by 10, or $10^2$, respectively. Accordingly, the gain switch has in effect the ranges 0 to 0.9, 0 to 9.9, and 0 to 99.

The actual value of the sampling interval or "sample time", is set off on sample time switch 34 which functions to cause the generator to operate on its input frequency after the fashion of gain switch 21's effect on multiplier 20, namely, a set of signals is set on connections 35 to provide a coded input to generator 30, which input corresponds to the decimal value indicated by the setting of switch 34, and so causing the generator to output pulses at the corresponding frequency.

In practice, the sampling interval may be on the order of one second, at least, and in some cases, can be measured in minutes. In FIG. 1, the sampling interval and timing of the controller's functions, are provided for by a sample time generator 36 and timing control 37. Generator 36 is functionally identical to generator 30 in that the former receives input from source 32 (via connection 38) and is set by sample time swtich 34 (via connections 35) for setting the sampling interval. However, generator 36 receives but the one input from source 32, and at a 1 Hz rate, which will be the maximum output rate of generator 36. The output of the generator 36 goes to timing control 37 and initiates a sequence of control pulses on the outputs 39 of timing control 37. Thus, generator 36 might be set to pass every other pulse on connection 38 to control 39, thereby initiating a basic sequence as follows:

1. Control 37 is pulsed by generator 36 and, more or less instantaneously, pulses converter 12, which takes a very brief interval to digitize the output of amplifier 10.

2. Control 37 next pulses register 16 to enter the results of digitizing into the register. Multipliers 18, 20 and 27 which keep counter 24 nulled at an output due to a previous deviation sampling, or are even in the act of so doing, act to null the counter 24 for the present sampling.

3. At this point, control 37 may initiate ancillary activities such as, for example, determining if the just-sampled deviation exceeds a deadband within which fall deviations which though the controller can detect them, should not be responded to, and so on.

4. After time enough for the rate multipliers and the up-down counter to have settled down, control 37 turns them off, and transfers the number in the up-down counter to output counter 26.

5. Control 37 now causes the counter 26 to count down at a rate set by generator 30, and simultaneously causes or allows one or the other of connections 5 and 6 to be energized during the countdown.

6. Once the countdown ends, motor control 4 de-energizes the motor 3. However, it is possible for the countdown to continue beyond the sampling interval, so independently of the countdown, the last thing control 37 does is to enable itself to repeat the above sequence when it is next pulsed by generator 36.

I have not disclosed any particular logic circuitry for timing control 37, for as will be seen from the foregoing it is the sort of thing well within the ordinary skill of the art. The only unusual feature of the timing scheme relates to the rate multiplier/up-down counter phase. This phase is relatively long as compared to the rest of the scheme (excluding the countdown of counter 26,) which superficially is a disadvantage. However, in this case, the rate multipliers are attractive for reasons of economy and simplicity, whereas their slowness is not really disadvantageous for service as a process controller because not only is 1 second or more much larger than the few milliseconds taken by the rate multiplier up-down counter phase, but also there are ancillary functions such as in (3), supra, which can usefully take advantage of the time taken by the rate multiplier up-down counter phase.

All the elements of the FIGURE are conventional. Thus, absolute value amplifier 10 may be merely an operational amplifier with rectification of the output. For $e$ in the form of a DC voltage, polarity detector 11 may be a zero crossing detector. For $e$ in AC form, deviation sense could be phase information, so detector 11 would detect phase reversal or equivalent.

The decade rate multipliers may be decimal versions of conventional binary rate multipliers such as Texas Instrument SN 74167 Decade Rate Multiplier. It will be observed that, as described above, sample time generator 35 and output rate generator 30 seem quite similar functionally to the rate multipliers. Actually, there is a quite significant distinction. A decade rate multiplier in the sense I use it has a stochastic element in its operation, namely, its output pulse train has an average frequency proportional to the product of its two inputs. In fact, it is this stochastic aspect that dictates the use of the feedback loop including multiplier 27.

The transfer function of a decade rate multiplier is the product of its inputs, divided by $10^n$, where $n$ is the number of decades in the multiplier. The counter 24 must see the same power of 10 at both its inputs in order to be able to come to equilibrium. In the present case, $n$ for multiplier 18 and 20 is 3 and 2, respectively, so $n$ for multiplier 27 must be 5.

The Texas Instrument multiplier referred to above is a single decade device, hence multiplier 18 is three of the former in cascade, multiplier 20 is two thereof in cascade, and multiplier is five thereof in cascade.

It is also to be observed that the signals applied at the parallel inputs of the multiplier's have to be directly proportional to the numbers they represent. In other words, the maximum outputs of multiplier's 20 and 27 are the frequencies on connections 23 and 29, namely, 1 megaHerz.

In order to prevent overcontrol of the process, I provide a deadband comparator 40 which receives the set of signals on connections 17 and compares them to a similar set generated internally of the comparator, by means of a switch forming part thereof and analogous to switch 21 or 34. However, the latter set will represent a number corresponding to the desired deadband, that is to say, if the number represented by the signals on connections is equal to or less than the number represented by the signals generated internally of the comparator, then it is preferable to avoid changing the position of valve 2 as long as the process deviation does not leave the deadband. Thus, the comparator 17 may produce a signal which will be transmitted to timing control 37 to cut short the control cycle, without counting down counter 26, and instead going immediately to the beginning of the next cycle. It should be noted that this does not mean stopping the system of multipliers 18, 20 and 27 and counter 26. This system operates continuously on all inputs from register 16 and the gain switch 21, by seeking or maintaining a null on the inputs to counter 24.

The most likely implementation of my controller for the most part, is solid state, more or less monolithic electronic circuitry. However, this is not true of the other elements of the system such as motor control 4 and motor 3. For example, value 2 may well be pneumatically or hydraulically driven with an air cylinder, diaphragm motor, or the like, providing the "motor" 3. In such case, "motor control" 4 would be a hybrid electromechanical device for transducing electrical signals from counter 26 and polarity detector 11 into appropriate non-electrical drive of valve 3 in the appropriate sense and magnitude. In the last analysis, the principles of my invention are essentially independent of the nature of the hardware, not withstanding the fact that certain disclosed parameters, such as the higher clock frequencies, may seem inappropriate or not entirely practical in a non-electrical context. In any event, to the extent the foregoing description may imply or set forth particular hardware, it is not to be construed as limiting the claims appreciated hereto.

Having described my invention as required by the statute, I claim:

1. A process controller comprising, in combination, an analog input means for receiving an input signal and producing a first output signal representing the absolute magnitude of said input signal and a second output signal representing the sense of said input signal;

a first conversion means for receiving said first output signal and converting it to a first set of digital signals representing a first number corresponding to said absolute magnitude;

a second conversion means for receiving said first set of digital signals and being responsive thereto for producing a first train of pulses corresponding to said first number;

and up/down counter means for receiving said first train of pulses and counting them up, and, while counting them up, producing a second set of digital signals representing a second number corresponding to the up-count at any instant;

a third conversion means for receiving said second set of digital signals and converting it to a second train of pulses representative of said second number;

said up/down counter means being connected to said third conversion means for receiving said second train of pulses and down-counting them while up-counting said first train;

an output counter connected to said up/down counter to receive said second set of digital signals for counting the number represented thereby down;

a rate generator means operable to set the rate at which said output counter counts down, and control means responsive to said output counter counting down for producing a control effect proportional to the time it takes to count the last said number down, said control means being also responsive to said second output signal for causing said control effect to have the sense of said input signal.

2. The process controller of claim 1 wherein said second conversion means includes fourth conversion means for receiving said first set of digital signals and converting it to a third train of pulses representative of said first number;

said second conversion means including fifth conversion means for receiving a gain signal and converting it to a third set of digital signals corresponding to said gain;

said second conversion means including sixth coanversion means for receiving said third set of digital signals and said third train of pulses for causing said first train of pulses to be representative of the product of said gain and said first number.

3. A process controller comprising, in combination, an analog device for producing an analog signal proportional to the magnitude of process deviation;

digital means for having applied thereto a first set of digital signals and responding thereto by producing a pulse the duration of which is proportional to a number represented by said first set;

converting means for converting a sampled value of said analog signal to said first set of digital signals;

a decimal setting device for converting a decimal value into a second set of digital signals and applying said second set to said digital means;

said digital means being responsive to said second set of digital signals for causing said pulse also to be proportional to said decimal value;

said digital means comprising an up/down pulse counter, an output counter, a first rate multiplier, a second rate multiplier and a third rate multiplier, each said rate multiplier having a first input for a first pulse train, a second input for a set of digital signals, and an output for a second pulse train representing the pulse rate of said first pulse train multiplied by a numerical factor represented by the last said set of digital signals;

said first rate multiplier having its output connected to the said first input of said second rate multiplier;

said second and third rate multipliers having their said outputs connected to said up/down counter for having the corresponding said second pulse trains respectively counted up and counted down substantially simultaneously, said up/down counter having an output for producing a set of digital signals representing the magnitude of the difference between its up count and its down count;

said up/down counter having its said output connected to said third rate multiplier's second input, and to said output counter for entering in this last a count proportional to the product of said number and said decimal value, there being means for converting the last said count into the first said pulse.

4. The process controller of claim 3, wherein means are provided for causing said converting means to sample said analog value at predetermined intervals and for causing said digital means to respond to successive samples of said analog signal for producing said pulse substantially repetitively.

5. A process controller comprising, in combination, an analog device for producing an analog signal proportional to the magnitude of process deviation;

digital means for having applied thereto a first set of digital signals and responding thereto by producing a pulse the duration of which is proportional to a first number represented by said first set;

converting means for converting a sampled value of said analog signal to said first set of digital signals;

a deadband comparator for comparing said first set of digital signals to a predetermined set of digital signals representing a second number proportional to a process deviation too small to allow said digital means to produce a said pulse of corresponding duration;

said comparator being responsive to said first set of signals corresponding to less than said second number for preventing production of a said pulse of corresponding duration;

said digital means being responsive to said first set of digital signals for causing said pulse's duration to be proportional to said deviation substantially only when said comparator's output indicates that said first number is greater than said second number;

said process controller also comprising, in combination, a setting device for providing a second set of digital signals and applying said second set to said digital means;

said digital means comprising, an up/down pulse counter, an output counter, a first rate multiplier, a second rate multiplier and a third rate multiplier, each said multiplier having a first input for a first pulse train, a second input for a set of digital signals, and a output for a second pulse train representing the pulse rate of said first pulse train multiplied by a numerical factor represented by the last said set of digital signals;

said first rate multiplier having its output connected to the said first input of said second rate multiplier;

said second and third rate multiplier having their said outputs connected to said up/down counter for having the corresponding said second pulse trains respectively counted up and counted down substantially simultaneously, said up/down counter having an output for producing a set of digital signals representing the magnitude of the difference between its up count and its down count;

said up/down counter having its said output connected to said third rate multiplier's second input, and to said output counter for entering in this last a count proportioanl to the product of said number and said decimal value, there being means for converting the last said count into the first said pulse.

* * * * *